United States Patent
Talbert

(10) Patent No.: US 8,819,223 B2
(45) Date of Patent: Aug. 26, 2014

(54) NETWORK COMPONENT MANAGEMENT

(75) Inventor: Michael Talbert, Nazareth, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 487 days.

(21) Appl. No.: 13/192,836

(22) Filed: Jul. 28, 2011

(65) Prior Publication Data

US 2013/0031237 A1 Jan. 31, 2013

(51) Int. Cl.
*G06F 15/16* (2006.01)
*H04L 29/08* (2006.01)
*H04L 12/24* (2006.01)

(52) U.S. Cl.
CPC .......... *H04L 29/08099* (2013.01); *H04L 12/24* (2013.01); *H04L 12/2455* (2013.01)
USPC ............ 709/224; 709/223; 705/28; 705/7.12; 705/7.15

(58) Field of Classification Search
CPC ............ H04L 12/2455; H04L 12/2458; H04L 12/2602; H04L 12/2621; H04L 12/2634; H04L 12/2668; H04L 12/2686; H04L 12/2686; H04L 29/08675; H04L 29/08099; H04L 43/045; H04L 43/14; H04L 67/025; H04L 67/22
USPC ................... 709/223–224; 705/28, 7.12, 7.15
See application file for complete search history.

(56) References Cited

U.S. PATENT DOCUMENTS

| | | | |
|---|---|---|---|
| 6,104,798 A * | 8/2000 | Lickiss et al. | 379/201.12 |
| 7,908,359 B1 * | 3/2011 | Soph | 709/224 |
| 7,934,131 B1 * | 4/2011 | Pinheiro et al. | 714/43 |
| 7,995,483 B1 * | 8/2011 | Bayar et al. | 370/241.1 |
| 8,214,533 B2 * | 7/2012 | Nishi | 709/249 |
| 8,510,476 B2 * | 8/2013 | Eastvold | 709/250 |
| 8,531,954 B2 * | 9/2013 | McNaughton et al. | 370/235 |
| 8,570,877 B1 * | 10/2013 | Bayar et al. | 370/241.1 |
| 2002/0129098 A1 * | 9/2002 | Stone et al. | 709/203 |
| 2003/0004685 A1 * | 1/2003 | Troia et al. | 702/188 |
| 2003/0061346 A1 * | 3/2003 | Pekary et al. | 709/224 |
| 2003/0086536 A1 * | 5/2003 | Salzberg et al. | 379/15.02 |
| 2004/0054771 A1 * | 3/2004 | Roe et al. | 709/224 |
| 2005/0027851 A1 * | 2/2005 | McKeown et al. | 709/224 |
| 2005/0050196 A1 * | 3/2005 | Aita et al. | 709/224 |
| 2005/0081188 A1 * | 4/2005 | Kumar et al. | 717/102 |
| 2005/0288986 A1 * | 12/2005 | Barts et al. | 705/9 |
| 2006/0282528 A1 * | 12/2006 | Madams et al. | 709/224 |
| 2007/0041330 A1 * | 2/2007 | Bostica et al. | 370/252 |
| 2007/0271369 A1 * | 11/2007 | Aydin et al. | 709/224 |
| 2008/0052394 A1 * | 2/2008 | Bugenhagen et al. | 709/224 |
| 2008/0137529 A1 * | 6/2008 | Sheikh et al. | 370/216 |
| 2009/0106278 A1 * | 4/2009 | Ramacher et al. | 707/100 |
| 2009/0281929 A1 * | 11/2009 | Boitet et al. | 705/28 |
| 2009/0319952 A1 * | 12/2009 | Riegel | 715/841 |

(Continued)

*Primary Examiner* — Alina N Boutah

(57) ABSTRACT

A network component management system includes a first network element and a second network element. The second network element is at a customer location and is configured to communicate with the first network element over a communication network. A computing device is configured to communicate with the first and second network elements over the communication network and includes a visibility tool configured to actively monitor the second network element and present a status of the second network element. The status of the second network element indicates whether the second network element is provisioned and able to communicate over the communication network. A method includes querying the network element, determining the status of the network element, presenting the status, and initiating a troubleshooting procedure if the network element is not provisioned or is unable to communicate over the communication network.

18 Claims, 6 Drawing Sheets

(56) References Cited

U.S. PATENT DOCUMENTS

| | | | |
|---|---|---|---|
| 2010/0074416 A1* | 3/2010 | Smith et al. | 379/32.04 |
| 2010/0332906 A1* | 12/2010 | Agrawal et al. | 714/37 |
| 2011/0060846 A1* | 3/2011 | Waldrop et al. | 709/249 |
| 2012/0011253 A1* | 1/2012 | Friedman et al. | 709/224 |
| 2012/0036254 A1* | 2/2012 | Onuma | 709/224 |
| 2012/0131466 A1* | 5/2012 | Bugenhagen | 715/733 |
| 2012/0159510 A1* | 6/2012 | Kumar et al. | 718/105 |
| 2012/0265872 A1* | 10/2012 | Chilton | 709/224 |
| 2012/0278485 A1* | 11/2012 | Qian et al. | 709/224 |
| 2013/0018632 A1* | 1/2013 | Field et al. | 702/183 |
| 2013/0124724 A1* | 5/2013 | Madgwick | 709/224 |

* cited by examiner

NETWORK COMPONENT MANAGEMENT

BACKGROUND

Network components allow consumers to access information and receive content from a communication network. Access to the communication network is controlled by a service provider that can provision network components that may be located at the consumer's home or place of business. Network components, therefore, may be provisioned to allow the consumer to receive media content, access the internet, make telephone calls, etc.

DETAILED DESCRIPTION

An example network component management system includes a first network element located at a service provider location and a second network element located at a customer location. The first and second network elements are configured to communicate with one another over a communication network. The system further includes a computing device configured to communicate with both the first and second network elements over the communication network. The computing device includes a visibility tool configured to actively monitor the second network element and present a status of the second network element to a user. The status of the second network element indicates to the user whether the second network element is provisioned and is able to communicate over the communication network. The system, therefore, may give the user of the computing device with end-to-end visibility of the communication network given the status of network elements and devices at the service provider and customer location. Such end-to-end visibility of the network may help technicians install network elements and devices at the customer location, give customer service representatives information to troubleshoot network connectivity issues, and allow customers to actively manage network devices at the customer location.

Figure 1:
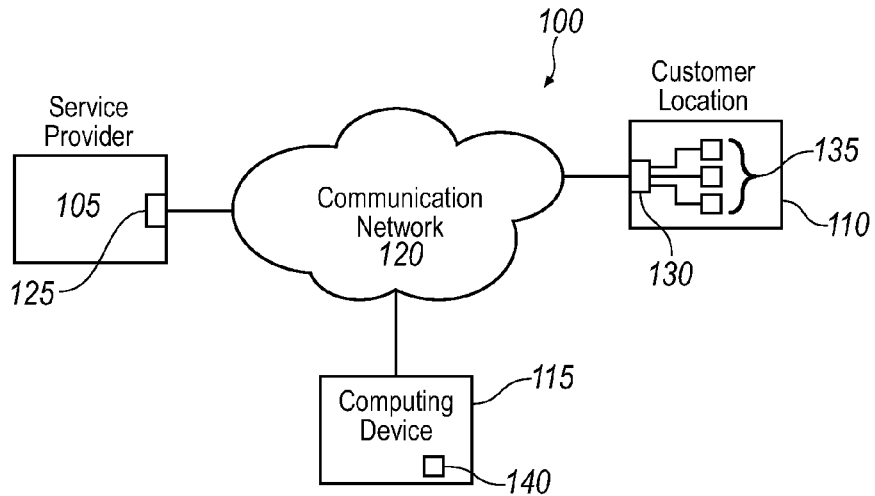
FIG. 1 is a schematic diagram of an example network component management system that includes a computing device having a visibility tool.

FIG. 1 illustrates an example network component management system 100. The system 100 may take many different forms and include multiple and/or alternate components and facilities. While an example system 100 is shown in FIG. 1, the example components illustrated in FIG. 1 are not intended to be limiting. Indeed, additional or alternative components and/or implementations may be used.

As illustrated in FIG. 1, the system 100 includes a service provider 105, a customer location 110, and a computing device 115 configured to communicate with one another over a communication network 120, such as a media content network, a computer network, a telecommunications network, etc. The communication network 120, therefore, may have a network infrastructure that includes fiber optic cables, coaxial cables, digital subscriber lines, telephone lines, satellites, cellular towers, and the like.

The service provider 105 may include any communications service provider that can grant consumers access to various types of content using one or more types of communication networks. For instance the service provider 105 may allow its customers to access one or more of a media content, computer, or telecommunications network using the network infrastructure. The service provider 105 may use one or more network elements, such as a first network element 125 as illustrated in FIG. 1, to communicate over the communication network 120. That is, the service provider 105 may use the first network element 125 to communicate with one or more network elements located at the customer location 110 to, e.g., direct content to the customer location 110. The first network element 125 may include any number of network interface devices, such as one or more of a router, access point, modem, optical network terminal, etc.

The customer location 110 may include any location where a customer wishes to receive content from the service provider 105 or access the communication network 120. For instance, the customer location 110 may include a customer's home or place of business. The customer location 110 may include one or more network elements, such as a second network element 130 as illustrated in FIG. 1, which may be configured to communicate with the first network element 125 over the communication network 120. That is, the second network element 130 may be configured to receive signals from the first network element 125 that may provision the second network element 130 to allow the second network element 130 to receive content from the service provider 105. The second network, therefore, element may include any number of network interface devices, such as one or more of a router, access point, modem, optical network terminal, etc.

Once provisioned, the second network element 130 may communicate with one or more network devices 135, such as a desktop computer, laptop computer, tablet computer, cellular phone, music player, set top box, etc., at the customer location 110. Each network device 135 may be configured to communicate with the second network element 130 based on the type of content associated with that particular network device 135. For instance, the second network element 130 may be configured to allow any desktop, laptop, or tablet computers at the customer location 110 to access content over the internet and allow a set top box to access media content such as broadcast and cable channels through a media content network. Other network devices 135 that may be located at the customer location 110 may include kitchen appliances such as a refrigerator, dishwasher, stove, and oven, as well as other appliances that may be in a house, apartment, or office building, such as a washing machine, dryer, hot water heater, furnace, air conditioning unit, etc. Therefore, once provisioned, the second network device 135 may be configured to allow one or more of these or other network devices 135 to communicate over the communications network in accordance with the access granted by the service provider 105.

The computing device 115 may include any device or devices that include any combination of software and hardware that can present information to and receive inputs from a user. For instance, the computing device 115 may include a display 145 (see FIGS. 2-8) and an input device, such as a keyboard, mouse, touch screen, etc. In addition, the computing device 115 may implement a visibility tool 140 via software, hardware, or a combination of both. The visibility tool 140 may be configured to actively monitor target network components, such as the second network element 130 or any number of network devices 135 located at the customer location 110, and present a status of the target network component to a user via an interface on the display 145.

As discussed in greater detail below, the user may be a technician installing the target network component at the customer location 110, a customer support representative tasked with troubleshooting the target network component, or a customer who wishes to view the status of the target network component located at the customer location 110. The status of the target network component, therefore, may include information about the second network element 130 or any of the network devices 135. In one possible approach, this information may include whether the second network element 130 is provisioned and whether the second network element 130 or any of the network devices 135 are able to communicate with the first network element 125 over the communication network 120.

The visibility tool 140 may be configured, in one possible implementation, to query the target network component and receive the status from the target network component in response to the query. In one possible approach, the status may verify that the second network element 130 is provisioned and able to communicate with the first network element 125 over the communication network 120. The status may alternatively verify that one or more of the network devices 135 at the customer location 110 are able to communicate over the communication network 120. If the target network component fails to respond to the query, the visibility tool 140 may be configured to determine that the target network component is not provisioned, unable to communicate over the communication network 120, or both. In one example implementation, the visibility tool 140 may be configured to wait a predetermined amount of time for the target network component to respond to the query. If no response is received within the predetermined amount of time, the visibility tool 140 may be configured to initiate a troubleshooting procedure, which may include automated attempts to provision the target network component, automated attempts to establish communication between the first network element 125 and the target network component, sending a message to the customer to, e.g., indicate that the target network component failed to respond to the query and ask the customer to confirm that the target network component is physically or wirelessly connected to the communication network 120, or generating a service order to dispatch a technician to the customer location 110. The visibility tool 140 may also or alternatively initiate other processes if the target network component fails to respond to the query.

As described in greater detail below with reference to FIGS. 2-8, the visibility tool 140 may give a user end-to-end visibility of the communication network 120 between the first network element 125 and the second network element 130 or network devices 135 located at the customer location 110. With this end-to-end visibility, the user, who may be a technician, customer service representative, or the customer, may monitor and actively manage the connection of the second network element 130 or any of the network devices 135 to the communication network 120. As discussed below, the visibility tool 140 may be configured to generate alerts based on the status of the target network component, allow the customer to compose messages that may be presented on one or more network devices 135, control which network devices 135 are granted access to the communication network 120 through the second network device 135, etc.

In general, computing systems and/or devices, such as the computing device 115 that implements the visibility tool 140, the first network element 125, the second network element 130, and any network devices 135 at the customer location 110, may employ any of a number of computer operating systems, including, but by no means limited to, versions and/or varieties of the Microsoft Windows® operating system, the Unix operating system (e.g., the Solaris® operating system distributed by Oracle of Redwood Shores, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system 100 elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

FIGS. 2-8 illustrate various displays 145 of the computing device 115 that may be presented to the user while using the visibility tool 140.

Figure 2:
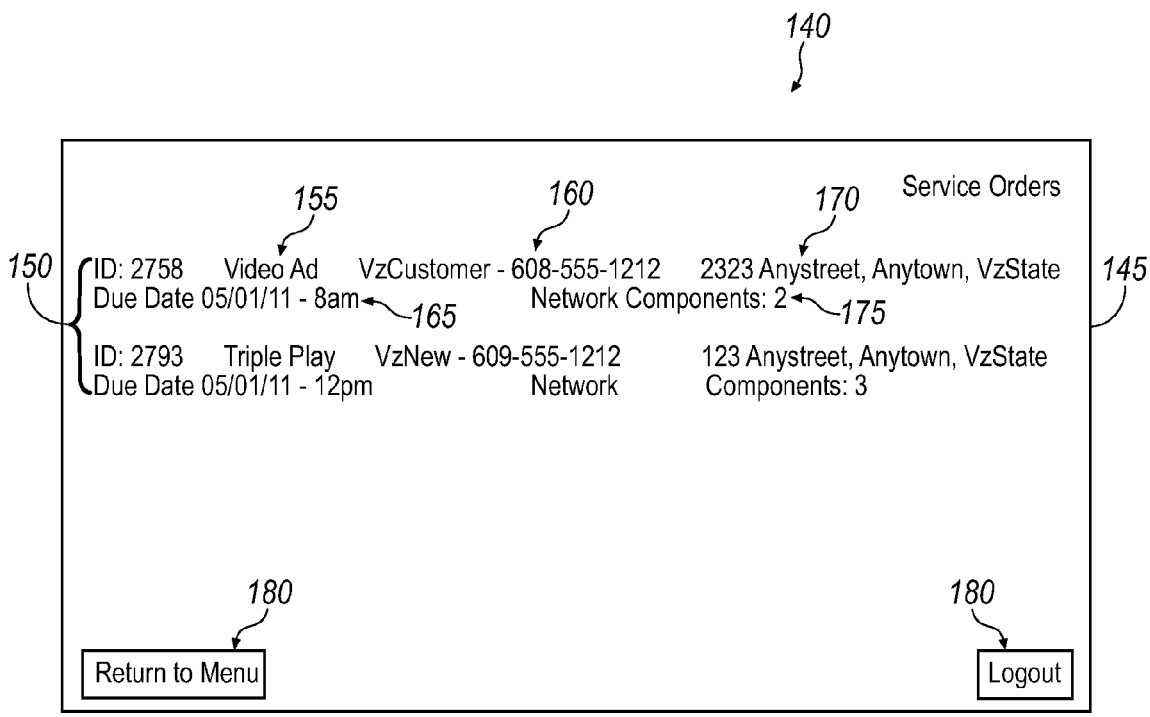
FIG. 2 illustrates an example display of a computing device presenting service orders to a user.

FIG. 2 illustrates an example display 145 that includes a list of service orders 150 that may be presented to a user, such as a technician, of the computing device 115 while using the visibility tool 140. For instance, the technician may log into the computing device 115 and be presented with service orders 150 assigned to the technician. Each service order 150 may identify a service 155 to be performed, the address 170 of the customer location 110 where the service 155 is to be performed, customer contact information 160, the time 165 the service 155 is scheduled to be performed at the customer location 110, and a count 175 of network elements 130, network devices 135, or both, needed to perform the service 155. The display 145 may also present navigation buttons 180, which may be virtual as illustrated in FIG. 2, which allow the user to navigate to other screens or logout of the visibility tool 140.

In one possible approach, the visibility tool 140 may indicate whether the service 155 is ready to be performed at the customer location 110. For example, each service order 150 may be color coded to indicate a status of the communication network 120 at the customer location 110. That is, the color "red" may indicate that the network infrastructure connecting the service provider 105 to the customer location 110 is not able to accommodate the service 155 defined by the service order 150. This may occur if, for instance, the service 155 requires that an optical network terminal be installed at the customer location 110, but there are no fiber optic cables at the customer location 110. When the technician sees the indication that the service 155 is not ready to be performed at the customer location 110, the technician may take a remedial action such as contact the customer to verify the service order 150 and update the service order 150 to define a service 155 that is appropriate for the network infrastructure at the customer location 110. The color "green" may indicate that the network infrastructure connecting the service provider 105 to the customer location 110 is able to accommodate the service 155 defined by the service order 150. Therefore, when the technician sees that the service order 150 is "green," for instance, the technician may proceed to the customer location 110 at the time 165 indicated by the service order 150. The visibility tool 140 may use other colors or present other indications of the status of the communication network 120 at the customer location 110.

The service orders 150 may further indicate whether the technician has the proper inventory to properly complete the service 155. For instance, the visibility tool 140 may be configured to keep an inventory of the network elements and network devices 135 available to the technician (e.g., in the technician's truck) for each service 155 in the list of service orders 150. The visibility tool 140 may be further configured to compare the count 175 of network elements and network devices 135 needed to perform each service 155 to the inventory to determine whether the technician has the appropriate network elements and devices to perform the service 155 at the customer location 110. If so, the service order 150 may be "green" or provide another indication that the service 155 is ready to be performed at the customer location 110. If the count 175 exceeds the inventory, the service order 150 may be "red" or give another indication that the inventory available to the technician is insufficient. The visibility tool 140 may be further configured to notify the technician of the location of available network elements and devices. In one possible approach, the visibility tool 140 may direct the technician to a warehouse or to nearby technicians who have a surplus of inventory.

Figure 3:
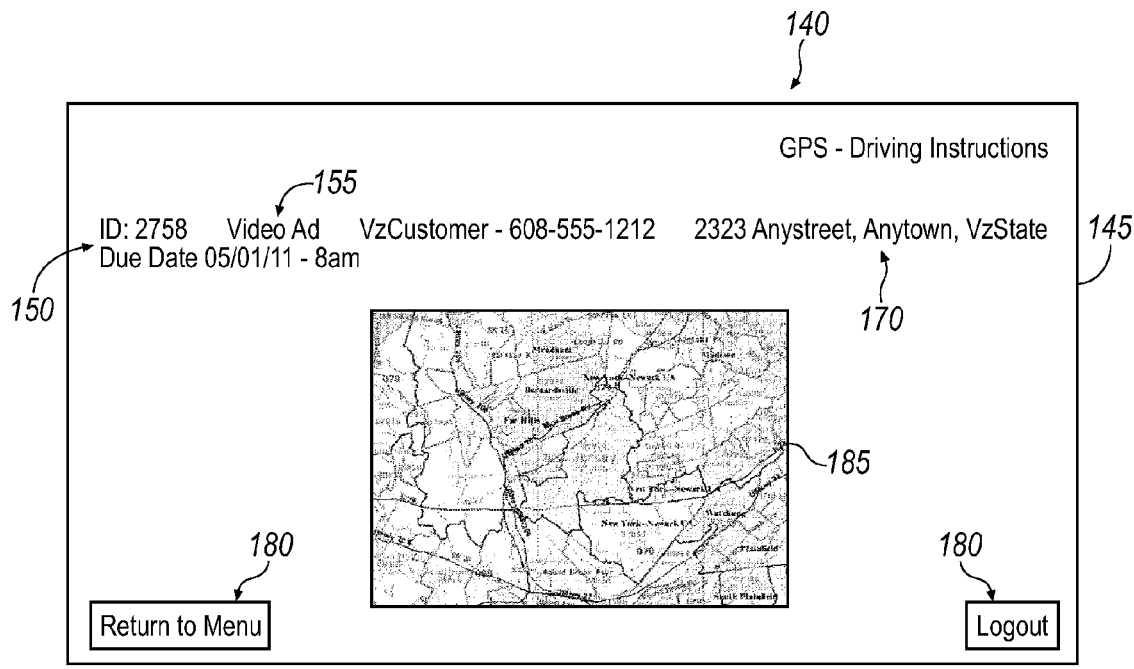
FIG. 3 illustrates an example display of the computing device presenting a map to a customer location to the user.

The technician may select one of the service orders 150, and as illustrated in the display 145 of FIG. 3, the visibility tool 140 may present the user with a map 185 to the customer location 110. In one possible implementation, the computing device 115 may include a location device (not shown), such as a Global Positioning System (GPS) device, to identify the present location of the technician. The visibility tool 140 or a mapping application may generate directions between the present location of the technician and the customer location 110. In addition, the visibility tool 140 may track the location of the technician at various times using, e.g., the GPS device and the mapping application.

Figure 4:
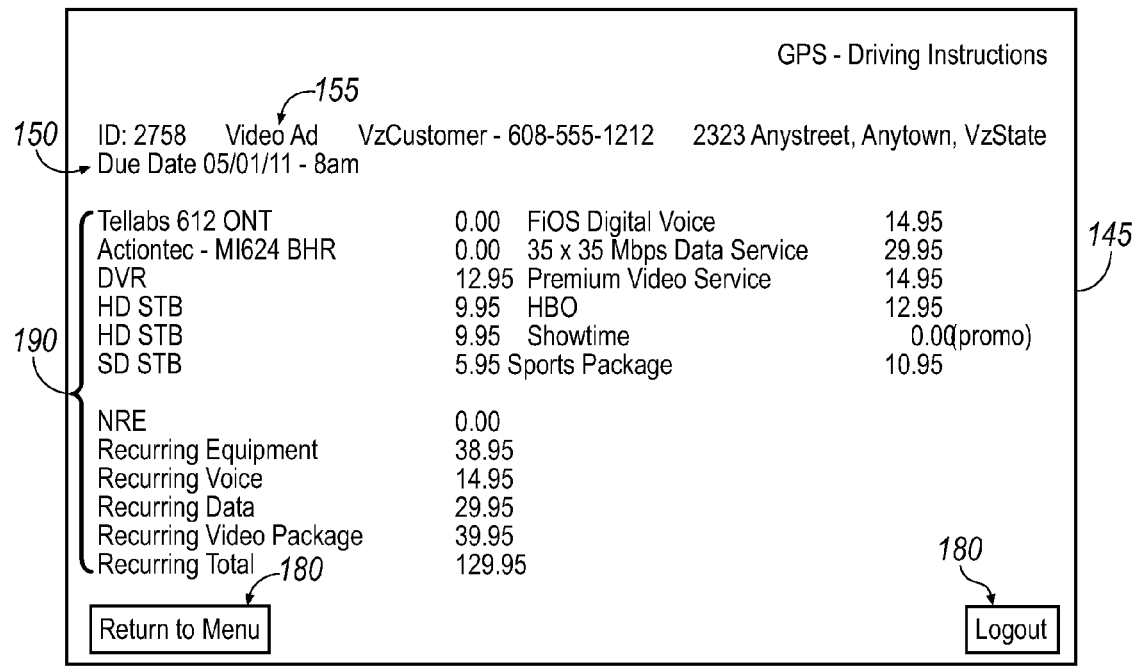
FIG. 4 illustrates an example display of the computing device presenting information associated with a service order to the user.

FIG. 4 illustrates example information 190 that may be presented on the display 145 of the computing device 115 while the technician is at the customer location 110 performing the service 155 identified by one of the service orders 150. For instance, the visibility tool 140 may present information 190 that indicates the service 155 to be performed and charges associated with performing that service 155. This way, the technician may present the information 190 to the customer to confirm that the technician is going to perform the service 155 requested by the customer and so the customer is aware of all costs, including recurring costs, of performing that service 155. The visibility tool 140 may further allow the technician to make changes to the service order 150 while at the customer location 110 and indicate whether the communication network 120 at the customer location 110 can support the updated service 155 and whether the technician's inventory is sufficient to complete the updated service 155.

Figure 5:
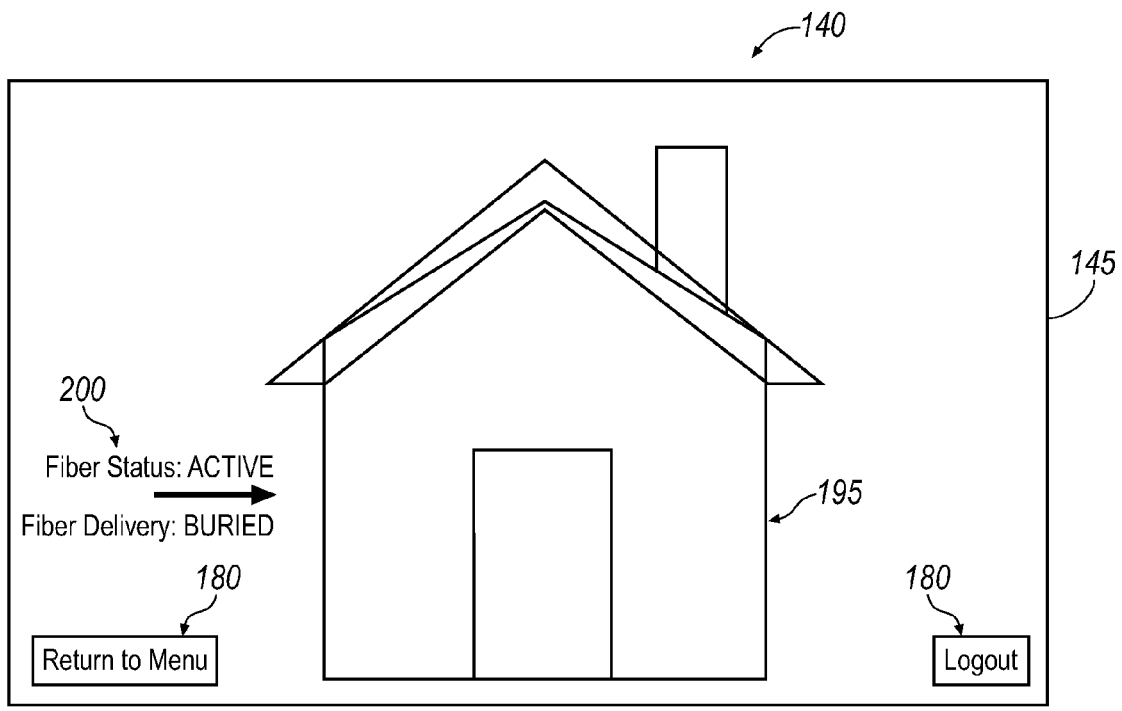
FIG. 5 illustrates an example display of the computing device indicating to the user whether the customer location is ready for a service to be performed.

FIG. 5 illustrates an example display 145 of the computing device 115 that may be presented to the technician while performing the service order 150 at the customer location 110. That is, the visibility tool 140 may present a graphical depiction 195 of the customer location 110. In FIG. 5, the customer location 110 is depicted as a house. However, the customer location 110 could alternatively be depicted as an apartment, office or other place of business, etc. The visibility tool 140 may also present the status 200 of the communication network 120 at the customer location 110 using text or a color code. For instance, the text "Fiber Status: ACTIVE" as presented in FIG. 5 with a green arrow may indicate that the customer location 110 is able to accommodate network elements and network devices 135 that can communicate with the communication network 120 via a fiber optic network infrastructure. If the status 200 presented to the technician indicates that the customer location 110 is not able to receive the service 155 defined by the service order 150, the technician may take a remedial action that may include updating the service 155 defined by the service order 150 or updating the communication network 120 at the customer location 110.

Figure 6:
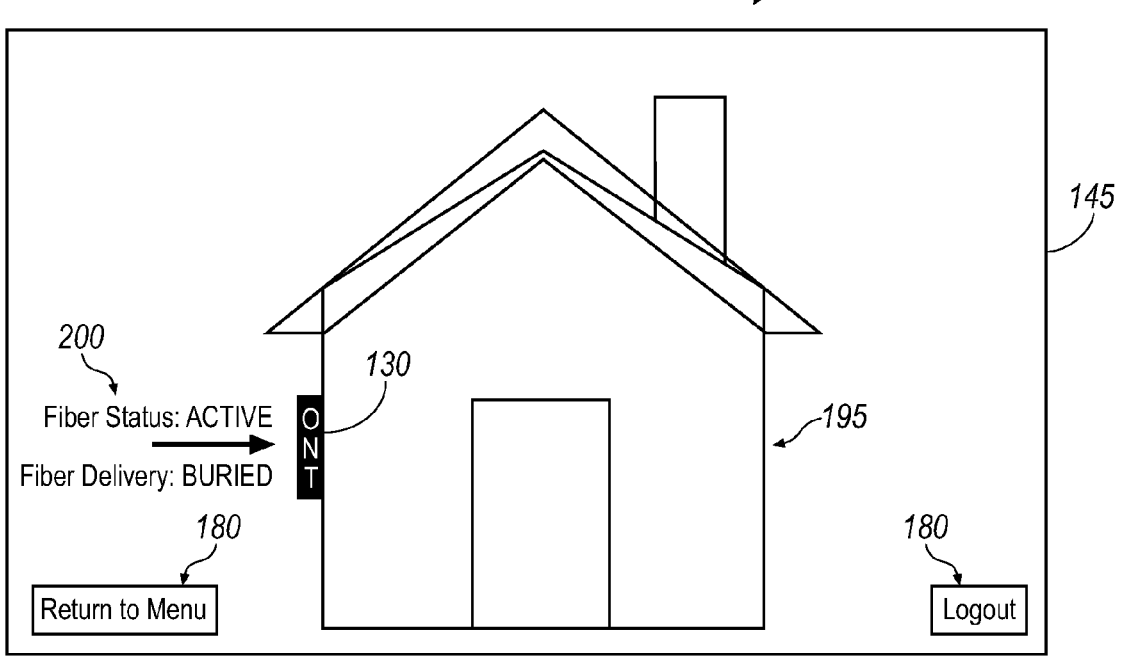
FIG. 6 illustrates an example display of the computing device presenting a status of a network element located at the customer location to the user.
Figure 7:
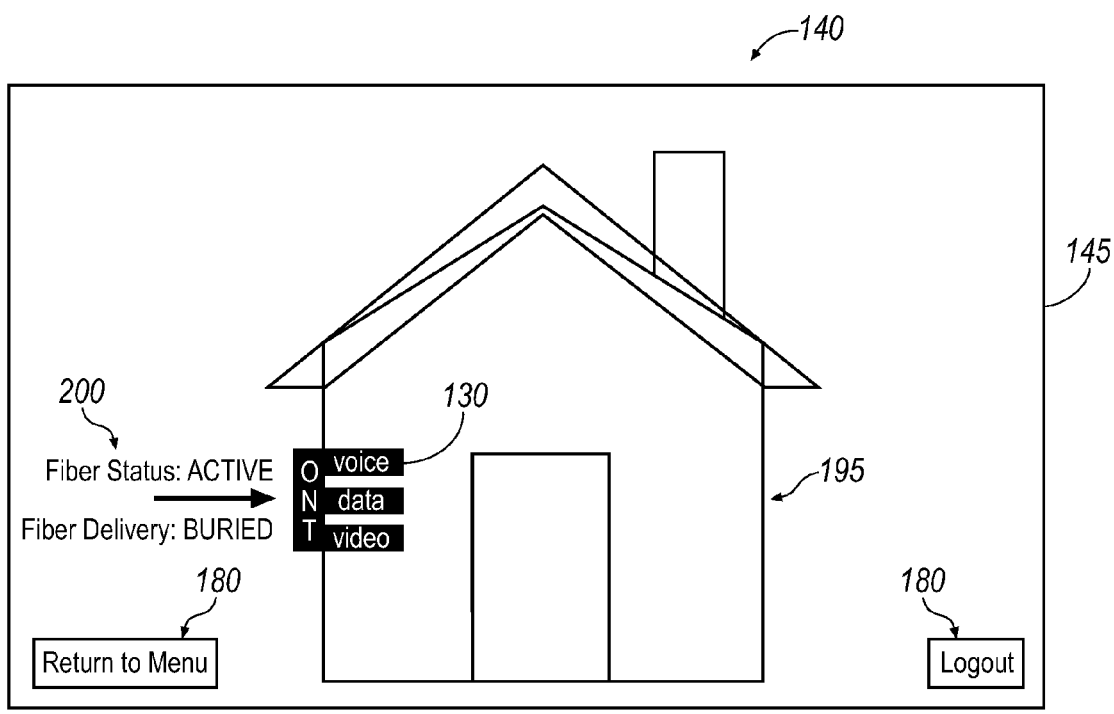
FIG. 7 illustrates an example display of the computing device indicating to the user services for which the network element is provisioned.

FIG. 6 is an example display 145 that may be presented to the technician while provisioning the second network element 130 at the customer location 110. In one possible implementation, the visibility tool 140 may prompt the technician to connect the second network element 130 to the communication network 120 and scan or otherwise input a serial number of the second network element 130. The visibility tool 140 may communicate the serial number of the second network element 130 to the first network element 125 of the service provider 105. The second network may be automatically provisioned, and as illustrated in FIG. 7, the visibility tool 140 may present an indication to the technician that the second network element 130 has been provisioned as well as identify which services are available via the second network element 130. For instance, the example display 145 in FIG. 7 shows that the second network element 130 is an optical network terminal that is provisioned to provide voice, data, and video services. Furthermore, the visibility tool 140 may be configured to use color-coding or another identifier to indicate whether the second network element 130 is able to communicate with the network. For instance, the second network element 130 may be presented as the color green if the second network element 130 is provisioned and able to communicate over the communication network 120 or the color red if the second network element 130 is not provisioned or unable to communicate over the communication network 120.

Figure 8:
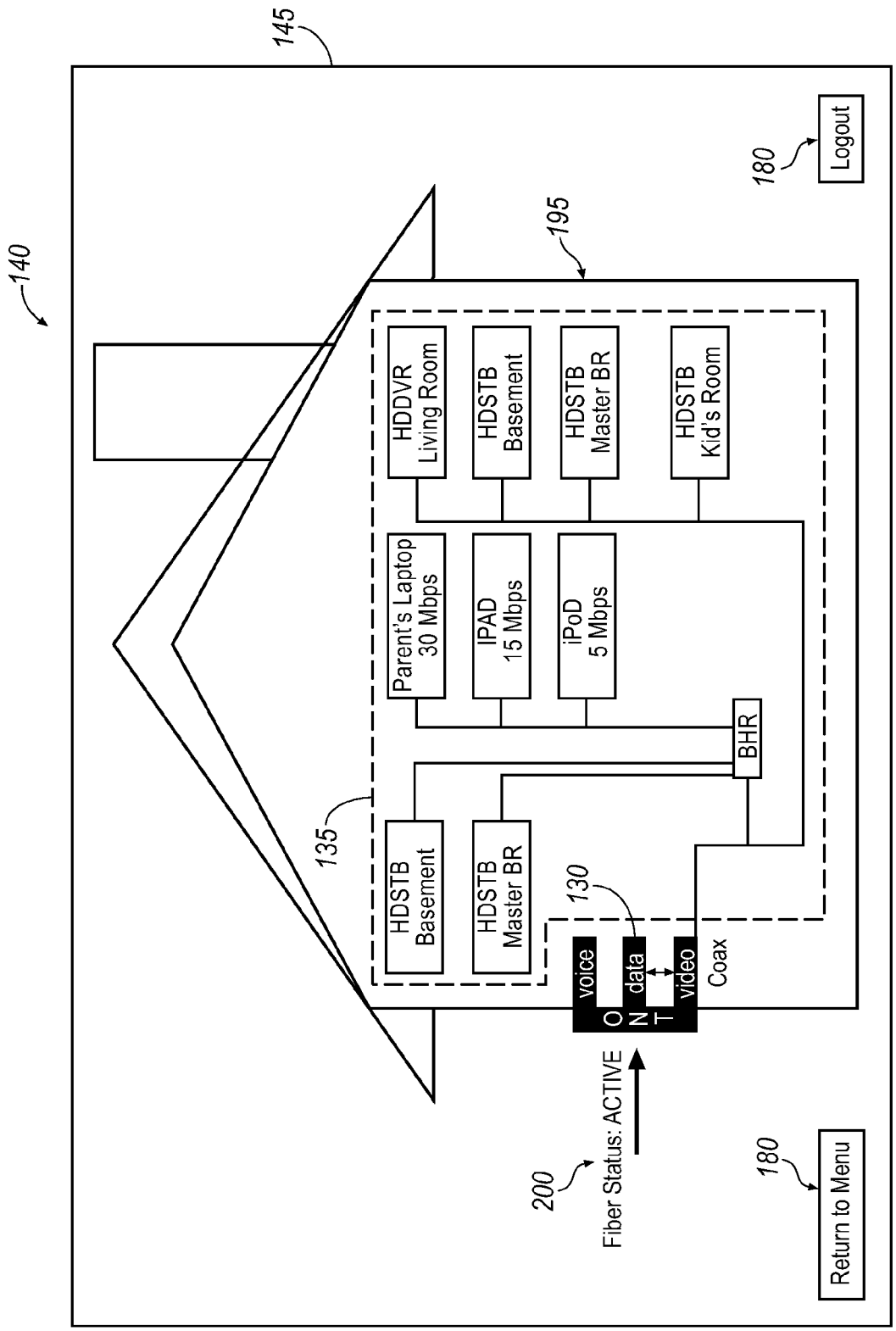
FIG. 8 illustrates an example display of the computing device presenting a status of each network device connected to the network element at the customer location.

FIG. 8 illustrates a display 145 of the visibility tool 140 that may be presented to the user of the visibility tool 140 to monitor the status of the second network element 130 and each network device 135 at the customer location 110. For instance, a technician may use the visibility tool 140 to confirm that the second network element 130 and each network device 135 is able to communicate over the communication network 120 at the time of installation while a customer service representative may use the visibility tool 140 to determine whether the second network element 130 and each network device 135 is able to communicate over the communication network 120 in response to a call from a customer. In some instances, the customer may access the visibility tool 140 via a web page on the internet to, for example, actively monitor the status of each network device 135 at the customer location 110.

Using the visibility tool 140, the user may manage any target network component at the customer location 110, including controlling which target network components are able to access the communication network 120 at the customer location 110. For instance, the visibility tool 140 may allow the user to designate specific network devices 135 that are granted access to the communication network 120, network devices 135 that are denied access to the communication network 120, the time of the day that each network device 135 is granted access, the content that may be provided to each network device 135, etc. In one possible approach, the user may use the visibility tool 140 to prevent others from impermissibly accessing the communication network 120 from the customer location 110. For example, the user may use the visibility tool 140 to prevent a neighbor's network device from wirelessly receiving content through the communication network 120. The visibility tool 140 may, however, allow the user to designate "guest" devices, which may include devices that are granted access to the communication network 120 at the customer location 110 for a limited period of time. This way, the customer may grant, e.g., a neighbor or visitor temporary access to the communication network 120.

Additionally, the visibility tool 140 may allow the user to set parental controls for each network device 135. That is, the visibility tool 140 may allow a parent to prevent computers or set top boxes located in a child's room from communicating over the communication network 120 between certain times or from receiving specific content determined by the parent. Furthermore, the visibility tool 140 may provide the user with statistics that show, for instance, how much time each network device 135 has been used.

The visibility tool 140 may further be configured to generate alerts that, in one particular implementation, may be communicated to the user via an email, text message, phone call, etc., and the user may be able to select which alerts to receive and customer the way the alerts are presented to the user. By way of example, the visibility tool 140 may alert the user if the second network element 130 or one of the network devices 135 is unable to communicate over the communication network 120. The alert may further prompt the user to indicate whether the user wishes for any remedial action to take place. For example, the alert may ask the user if the user would like for a service order 150 to be generated to have a technician investigate the basis for the alert. Other alerts may include a message to the user that an unknown network device 135 has attempted to access the communication network 120 at the customer location 110, that media content was purchased and transmitted to a set top box at the customer location 110, etc.

In one example implementation, the visibility tool 140 may automatically initiate a troubleshooting procedure before generating the alert to the user. That is, if the target network component fails to respond to the query from the visibility tool 140, the visibility tool 140 may automatically attempt to provision or reestablish communication with the target network component. The visibility tool 140 may initiate the troubleshooting procedure if a predetermined number of such attempts fail to reestablish communication. Alternatively, the visibility tool 140 may generate an alert asking if the user authorizes the visibility tool 140 to attempt a troubleshooting procedure.

The visibility tool 140 may be configured to allow the user to generate messages that may be displayed on one or more network devices 135 at the customer location 110. For instance, using the visibility tool 140, the user may determine that someone at the customer location 110 is watching television based on the network activity of a set top box (e.g., one of the network devices 135). By way of example only, the user may wish to send a message to whoever is watching the television that the user will be home shortly. The user may compose the message using the visibility tool 140, and the visibility tool 140 may transmit the message to the set top box. Upon receipt of the message, the set top box may cause the composed message to be displayed on a television associated with the set top box that received the message.

Figure 9:
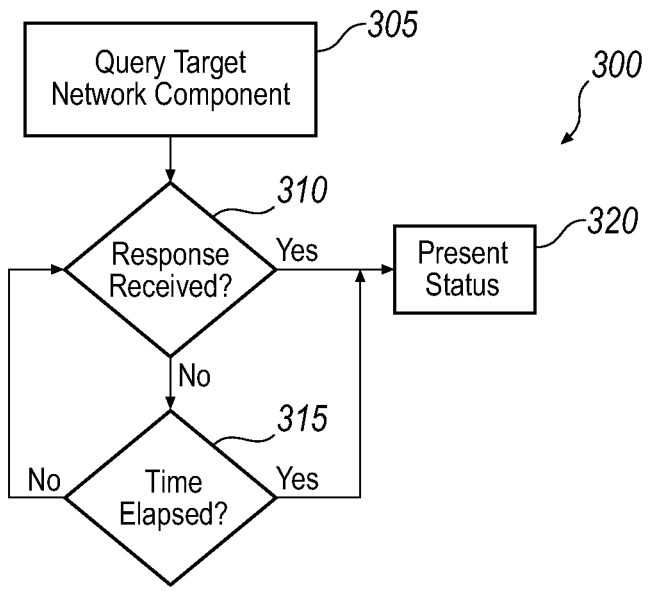
FIG. 9 is a flowchart of an example process that may be implemented by the visibility tool to determine the status of each network element or device at the customer location.

FIG. 9 illustrates a flowchart of an example method 300 that may be used by the visibility tool 140 to, for instance, actively monitor the target network component at the customer location 110.

At block 305, the visibility tool 140 may query the target network component, which may include any network elements, such as the second network element 130, or network devices 135 at the customer location 110. In one possible approach, the visibility tool 140 may transmit the query to the target network component over the communication network 120. The query may request that the target network component respond to the query.

At decision block 310, the visibility tool 140 may determine whether a response has been received from the target network component. The response may acknowledge that the target network component received the query. If the response is received, the visibility tool 140 may conclude that the target network component is provisioned, able to communicate over the communication network 120, or both, and the method 300 may continue at block 320. If no response is received, the method 300 may continue at block 315.

At decision block 315, the visibility tool 140 may determine whether a predetermined amount of time has elapsed since sending the query to the target network component. If the predetermined amount of time has not elapsed, the method 300 may return to block 310 to determine if the response has been received yet. If the predetermined amount of time has elapsed, the method 300 may continue at block 320.

At block 320, the visibility tool 140 may present the status to the user. For instance, if the response was received before the predetermined amount of time elapsed the status may indicate that the target network component is provisioned, able to communicate over the communication network 120, or both. If no response is received before the predetermined amount of time elapses, the status may indicate that the target network component is not provisioned or is unable to communicate over the communication network 120. In that instance, the visibility tool 140 may initiate a troubleshooting procedure, as described above.

Figure 10:
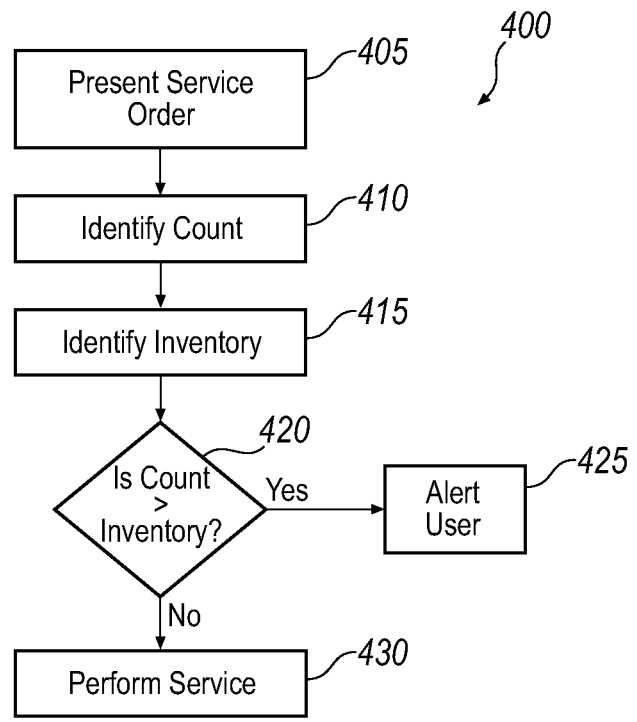
FIG. 10 is a flowchart of an example process that may be implemented by the visibility tool to determine whether a technician can perform the service identified by the service order.

FIG. 10 illustrates a flowchart of an example method 400 that may be used by the visibility tool 140 to, e.g., determine whether a service 155 can be performed at a customer location 110.

At block 405, the visibility tool 140 may present a service order 150 to the user. That is, as illustrated above in FIG. 2, the visibility tool 140 may present one or more service orders 150 that may each identify a service 155, the address 170 of the customer location 110 associated with the service 155 (e.g., the address 170 where the service 155 is to be performed), customer contact information 160, the time 165 the service 155 is scheduled to be performed at the customer location 110, etc.

At block 410, the visibility tool 140 may identify a count 175 of the number of network elements 130, network devices 135, or both, associated with the service 155. In one possible approach, this count 175 may be presented to the user as part of the service order 150.

At block 415, the visibility tool 140 may identify an inventory of the number of network elements 130 and network devices 135 available to the user. For instance, the inventory may include the number of network elements 130 and network devices 135 available to the user to perform one or more of the services 155 defined by the service orders 150 presented at block 405.

At decision block 420, the visibility tool 140 may compare the count 175 identified at block 410 to the inventory identified at block 415. If the count 175 exceeds the inventory, the method 400 may continue at block 425. If the count 175 does not exceed the inventory, the method 400 may continue at block 430.

At block 425, the visibility tool 140 may alert the user that the inventory of network elements 130 or network devices 135 available to the user is insufficient to perform the service 155 or services 155 defined by the service orders 150. The visibility tool 140 may further provide the user with nearby sources, such as other users or a warehouse, where the user may supplement the inventory.

At block 430, the visibility tool 140 may indicate to the user that the inventory is sufficient to complete the service 155 defined by the service order 150. The user may then continue to the customer location 110 to perform the service 155 defined by the service order 150.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A network component management system comprising:
   a first network element located at a service provider location;
   a second network element located at a customer location and configured to communicate with the first network element over a communication network; and
   a computing device configured to communicate with the first network element and the second network element over the communication network, wherein the computing device includes a visibility tool configured to actively monitor the second network element and present a status of the second network element, wherein the status of the second network element indicates whether the second network element is provisioned and is able to communicate over the communication network,
   wherein the visibility tool is configured to present at least one service order, wherein each service order identifies a service, the customer location associated with the service, and a count of one or more network elements or network devices associated with the service, and
   wherein the visibility tool is configured to compare the count of one or more network elements or network devices associated with the service to an inventory and to selectively generate an alert if the count exceeds the inventory.

2. A network component management system as set forth in claim 1, wherein the visibility tool is configured to query the second network element and receive the status from the second network element in response to the query.

3. A network component management system as set forth in claim 2, wherein the visibility tool is configured to determine that the second network element is not provisioned or is unable to communicate over the communication network if the second network element fails to respond to the query from the visibility tool.

4. A network component management system as set forth in claim 2, wherein the visibility tool is configured to wait a predetermined amount of time for the second network element to respond to the query and initiate a troubleshooting procedure if the second network element fails to communicate the status within the predetermined amount of time.

5. A network component management system as set forth in claim 4, wherein the troubleshooting procedure includes transmitting a message indicating that the second network element failed to respond to the query.

6. A network component management system as set forth in claim 1, further comprising a plurality of network devices located at the customer location and configured to access the communication network through the second network element.

7. A network component management system as set forth in claim 6, wherein the visibility tool is configured to actively monitor each of the plurality of network devices and present a status of each network device, wherein the status of the each network device indicates whether that network device is able to communicate over the communication network.

8. A network component management system as set forth in claim 7, wherein the visibility tool is configured to allow user management of the connection of one or more of the plurality of network devices to the communication network.

9. A network component management system as set forth in claim 8, wherein the visibility tool is configured to query each network device and receive the status from each network device in response to the query.

10. A network component management system as set forth in claim 9, wherein the visibility tool is configured to initiate a troubleshooting procedure if one or more of the plurality of network devices fails to respond to the query.

11. A network component management system as set forth in claim 1, wherein the visibility tool is configured to determine a status of the communication network at the customer location and to selectively generate an alert as to whether the service can be performed at the customer location based on the status.

12. A network component management system comprising:
a first network element located at a service provider location;
a second network element located at a customer location and configured to communicate with the first network element over a communication network; and
a computing device configured to communicate with the first network element and the second network element over the communication network, wherein the computing device includes a visibility tool configured to actively monitor the second network element and present a status of the second network element, wherein a status of the second network element selectively indicates whether the second network element is provisioned and is able to communicate over the communication network;
wherein the visibility tool is configured to:
present at least one service order, wherein each service order identifies a service, the customer location associated with the service, and a count of one or more network elements or network devices associated with the service;
compare the count to an inventory; and
selectively generate an alert if the count exceeds the inventory; and
wherein the visibility tool is configured to determine a status of the communication network at the customer location and selectively generate an alert as to whether the service can be performed at the customer location based on the status.

13. A method comprising:
presenting, via a computing device, a service order to a user of the computing device, wherein the service order identifies a service, a customer location, and a count of network components that are associated with the service;
comparing, via the computing device, the count to an inventory; and
alerting the user, via the computing device, if the count exceeds the inventory;
querying, via the computing device, a given network component of the network components associated with the service, the given network component being located at the customer location;
determining, via the computing device, a status of the given network component, wherein the status of the given network component indicates whether the given network component is able to communicate over a communication network;
presenting, via the computing device, the status of the given network component to the user; and
initiating, via the computing device a troubleshooting procedure if the given network component is unable to communicate over the communication network.

14. A method as set forth in claim 13, wherein determining the status of the given network component includes:
waiting for a response from the given network component a predetermined amount of time after querying the given network component; and
determining that the given network component is able to communicate over the communication network if the response is received within the predetermined amount of time.

15. A method as set forth in claim 13, wherein the given network component includes a network element, and wherein determining the status of the given network component includes determining whether the network element is provisioned.

16. A method as set forth in claim 15, wherein initiating the troubleshooting procedure includes initiating the troubleshooting procedure if the given network element is unable to communicate over the communication network.

17. A non-transitory computer readable medium having program code written thereon, the program code being configured to, when executed by a processor, cause the processor to perform operations comprising:
communicating with a first network element located at a service provider location;
displaying one or more service orders, each of the service orders identifying a service ordered by a customer from the service provider, a customer location associated with the service, and a count of any second network elements and any network devices associated with the service, the second network elements being configured to communicate with the first network element from the customer location associated with the service via a communications network, the network devices being configured to connect to the communications network via one of the second network elements;
for each of the service orders, comparing the count of each of the service orders to an inventory of a technician associated with the service orders and selectively generating an alert if the respective count exceeds the inventory; and
for a given one of the service orders:
determining statuses of those of the second-network elements and those of the network devices that are identified by the given one of the service orders, the statuses indicating whether the respective second network elements and network devices have been provisioned or are able to communicate over the communication network, and displaying the statuses of the second-network elements and the network devices.

18. The non-transitory computer readable medium of claim 17, wherein the operations further comprise:

for each of the service orders, determining a status of the communication network at the customer location identified in the respective service order and selectively generating an alert when the service identified in the respective service order cannot be performed at the customer location based on the status of the communication network at the customer location.

* * * * *